(12) United States Patent
Choi et al.

(10) Patent No.: US 9,264,847 B2
(45) Date of Patent: Feb. 16, 2016

(54) METHOD FOR TRANSMITTING SIGNAL USING SHORT RANGE COMMUNICATION AND ELECTRONIC DEVICE THEREOF

(71) Applicant: Samsung Electronics Co., Ltd., Gyeonggi-do (KR)

(72) Inventors: Hyun-Chul Choi, Seoul (KR); Moo-Young Kim, Seoul (KR); Chi-Hyun Cho, Gyeonngi-do (KR); Chang-Ryong Heo, Gyeonngi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 14/268,942

(22) Filed: May 2, 2014

(65) Prior Publication Data

US 2014/0329486 A1   Nov. 6, 2014

(30) Foreign Application Priority Data

May 2, 2013   (KR) .................. 10-2013-0049588

(51) Int. Cl.
*H04W 4/00* (2009.01)
*H04W 4/22* (2009.01)

(52) U.S. Cl.
CPC ............... *H04W 4/008* (2013.01); *H04W 4/22* (2013.01)

(58) Field of Classification Search
None
See application file for complete search history.

(56) References Cited

U.S. PATENT DOCUMENTS

| | | | |
|---|---|---|---|
| 2005/0057359 A1* | 3/2005 | Coffey et al. | 340/539.21 |
| 2006/0040680 A1* | 2/2006 | Daurensan | 455/457 |
| 2007/0239355 A1* | 10/2007 | Oh et al. | 701/211 |
| 2008/0014869 A1* | 1/2008 | Demirbasa et al. | 455/41.2 |
| 2010/0279647 A1* | 11/2010 | Jacobs et al. | 455/404.1 |
| 2011/0063105 A1* | 3/2011 | Bennett et al. | 340/539.11 |
| 2012/0295638 A1* | 11/2012 | Yamauchi | 455/456.1 |
| 2014/0051379 A1* | 2/2014 | Ganesh et al. | 455/404.1 |
| 2014/0197948 A1* | 7/2014 | Mo et al. | 340/539.13 |

FOREIGN PATENT DOCUMENTS

KR   10-2005-0077195   8/2005

* cited by examiner

*Primary Examiner* — Kimberly A Williams

(57) ABSTRACT

A method and electronic device for transmitting an emergency signal. The method includes: establishing a short-range communication link with a counterpart electronic device using a first short-range communication network; generating an emergency signal when the short-range communication link with the counterpart electronic device is cut off; and broadcasting the emergency signal using a second short-range communication network.

22 Claims, 15 Drawing Sheets

METHOD FOR TRANSMITTING SIGNAL USING SHORT RANGE COMMUNICATION AND ELECTRONIC DEVICE THEREOF

PRIORITY

The present application is related to and claims priority under 35 U.S.C. §119 to an application filed in the Korean Intellectual Property Office on May 2, 2013 and assigned Serial No. 10-2013-0049588, the contents of which are incorporated herein by reference.

TECHNICAL FIELD

The present disclosure relates generally to a method for transmitting a signal and an electronic device thereof.

BACKGROUND

As the number of users of portable electronic devices increases due to their portability and provision of various multimedia services, it is possible to provide a service of transmitting emergency information, such as missing-child information or disaster information, using the portable electronic devices.

In a case where an emergency information transmission service is provided using the portable electronic devices, when the emergency information is transmitted with respect to a widespread region at one time, the user of a portable electronic device that receives the emergency signal may not recognize how a location at which the user is located is associated with the emergency information. Accordingly, there is a need for a method for providing emergency information in consideration of a location of a portable electronic device.

SUMMARY

To address the above-discussed deficiencies, it is a primary object to provide an apparatus and method for transmitting emergency information in an electronic device.

Another object of the present disclosure is to provide an apparatus and method for transmitting emergency information using short range communication in an electronic device.

Another object of the present disclosure is to provide an apparatus and method for transmitting emergency information using short range communication in an electronic device having no GPS module.

Another object of the present disclosure is to provide an apparatus and method for relaying emergency information using short range communication in an electronic device.

Another object of the present disclosure is to provide an apparatus and method for relaying emergency information using short range communication in an electronic device which is in a sleep mode.

Another object of the present disclosure is to provide an apparatus and method for transmitting emergency information using short range communication in an electronic device which supports only short range communication.

Another object of the present disclosure is to provide an apparatus and method for relaying emergency information without exposing the emergency information to a user according to emergency information types in an electronic device.

According to an aspect of the present disclosure, a method for transmitting an emergency signal in an electronic device includes: establishing a short-range communication link with another electronic device (ex. counterpart electronic device) using a first short-range communication network; generating an emergency signal when the short-range communication link with the other electronic device is disconnected; and broadcasting the emergency signal using a second short-range communication network.

The short-range communication link ID may include identification information generated by applying a random number to unique identification information for at least one electronic device of the electronic device or the counterpart electronic device, and the unique identification information may include at least one of a MAC address, a mobile equipment ID (MEID), an International Mobile Equipment Identity (IMEI) or a telephone number.

The first short-range communication network and the second short-range communication network may be identical to or different from each other, and the near-field communication network may include at least one of infrared wireless communication, Bluetooth communication, Zigbee communication, or wireless LAN communication.

According to another aspect of the present disclosure, a method for receiving an emergency signal in an electronic device includes: receiving an emergency signal through a short-range communication network; determining whether the electronic device is a destination of the emergency signal; identifying one or more of an emergency situation type and emergency situation location information included in the emergency signal when the electronic device is the destination of the emergency signal; and displaying one or more of the emergency situation type and the emergency situation location information.

According to another aspect of the present disclosure, an electronic device includes at least one short-range communication unit; and at least one processor, wherein the processor establishes a short-range communication link with another electronic device (ex. counterpart electronic device) using a first short-range communication network through the short-range communication unit, generates an emergency signal when the short-range communication link with the other electronic device is disconnected, and broadcasts the emergency signal using a second short-range communication network through the short-range communication unit.

The short-range communication link ID may include identification information generated by applying a random number to unique identification information for at least one electronic device of the electronic device or the other electronic device, and the unique identification information may include at least one of a MAC address, a mobile equipment ID (MEID), an International Mobile Equipment Identity (IMEI) or a telephone number.

The first short-range communication network and the second short-range communication network may be identical to or different from each other, and the near-field communication network may include at least one of infrared wireless communication, Bluetooth communication, Zigbee communication, or wireless LAN communication.

According to another aspect of the present disclosure, an electronic device includes: a display unit; at least one short-range communication unit; and at least one processor, wherein the processor receives an emergency signal through the short-range communication unit, determines whether the electronic device is a destination of the emergency signal, identifies one or more of an emergency situation type or emergency situation location information included in the emergency signal when the electronic device is the destination of the emergency signal, and displays one or more of the emergency situation type or the emergency situation location information on the display unit.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Exemplary embodiments of the present disclosure will be described herein below with reference to the accompanying drawings so that those skilled in the art can easily embody the present disclosure. In the following description of the exemplary embodiments, detailed descriptions of well-known functions or configurations will be omitted since they would unnecessarily obscure the subject matters of the present disclosure. Furthermore, terms to be described below have been defined by considering functions in embodiments of the present disclosure, and may be defined differently depending on a user or operator's intention or practice. Therefore, the definitions of such terms are based on the descriptions of the entire present specification.

Embodiments of the present disclosure provide technology of transmitting emergency information through a short-range communication network.

In embodiments of the present disclosure, the electronic device may be one or more of a portable electronic device, a portable terminal, a mobile terminal, a mobile pad, a media player, a personal digital assistant (PDA), a desktop computer, a laptop computer, a smart phone, a netbook computer, a television, a mobile Internet device (MID), an ultra mobile PC (UMPC), a tablet PC, a navigation, or an MPEG Audio Layer-3 (MP3) player. In addition, the electronic device may be any one electronic device in which the functions of two or more devices among the above-described devices are integrated.

The present disclosure relates to a method for transmitting emergency information through a short-range communication network and an electronic device thereof.

Figure 1:
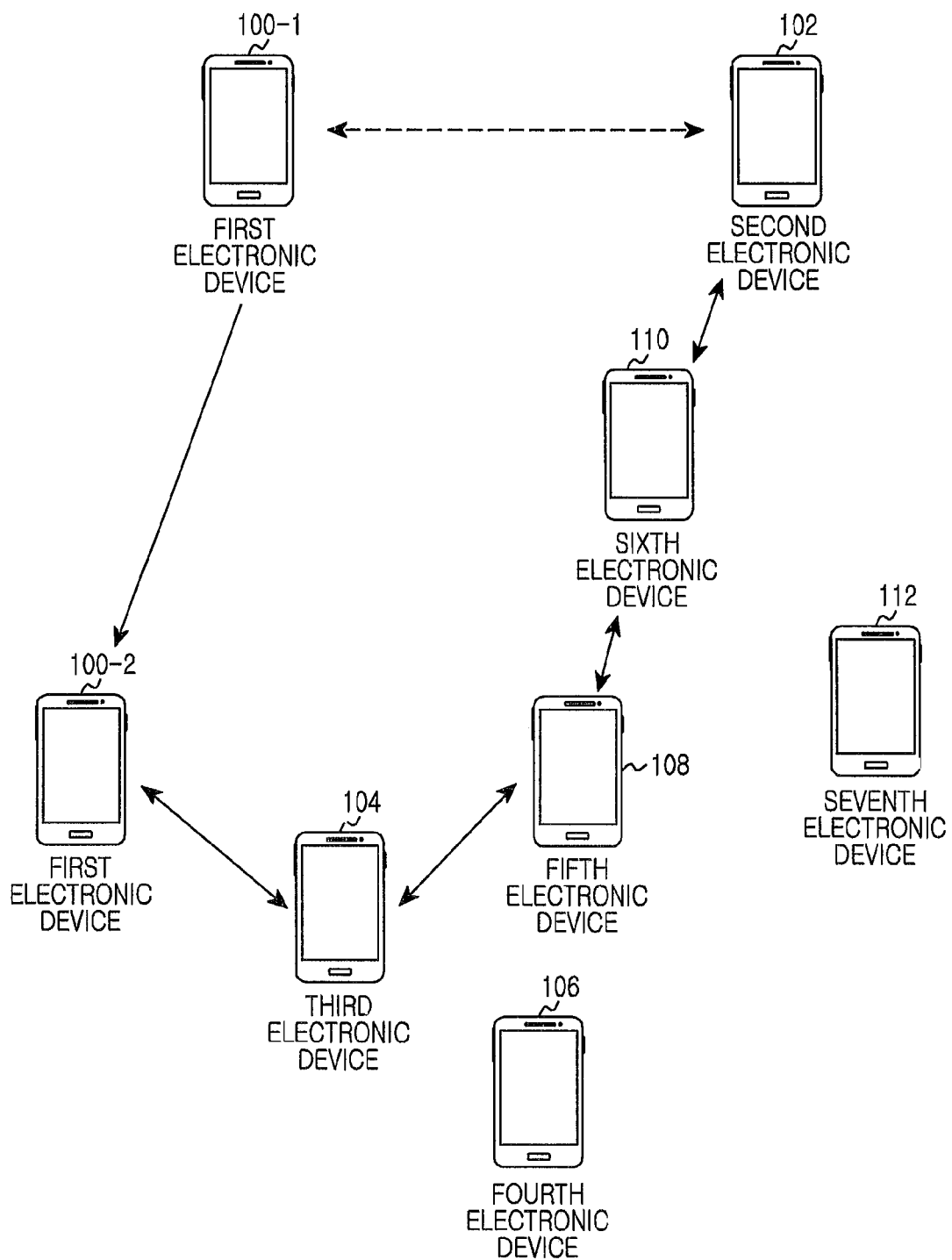
FIG. 1 illustrates a configuration for transmitting position information of a missing child using short-range communication according to an embodiment of the present disclosure.

FIG. 1 illustrates a configuration for transmitting position information of a missing child using short-range communication according to an embodiment of the present disclosure.

Referring to FIG. 1, a first electronic device 100-1 carried by a child and a second electronic device 102 carried by a parent may establish a short-range communication link according to a first short-range communication method for missing child prevention. In this case, the first electronic device 100-1 and the second electronic device 102 may generate and store an alert identifier (ID) for the short-range communication link for identifying the near-field communication link. For example, the first electronic device 100-1 and the second electronic device 102 may generate the alert ID for the short-range communication link by applying a random number to the unique identification information of at least one of the first electronic device 100-1 or the second electronic device 102. That is, the first electronic device 100-1 and the second electronic device 102 may prevent the unique identification information of the first electronic device 100-1 and the second electronic device 102 from being exposed to the outside by using the random number when transmitting a missing-child occurrence alert message using the short-range communication. Alternatively, the first electronic device 100 and the second electronic device 102 may set the unique identification information of their counterpart electronic devices as the alert ID for the short-range communication link. In this case, the unique identification information may include at least one of a MAC address, a mobile equipment identifier (MEID), an international mobile equipment identity (IMEI), or a telephone number of an electronic device.

When the first electronic device 100-1 is out of a first short-range communication range with the second electronic device 102 due to the movement (100-1→100-2) of the first electronic device 100-1, the first electronic device 100-2 may broadcast the missing-child occurrence alert message including the alert ID for the short-range communication link with the second electronic device 102 to neighboring devices included in a second short-range communication range by using second short-range communication. That is, the first electronic device 100-2 may broadcast an emergency signal including the alert ID for the short-range communication link with the second electronic device 102 and missing-child occurrence information to the neighboring devices by using the second short-range communication. For example, when the strength of a signal from the second electronic device 102 according to the first short-range communication method is equal to or lower than a reference strength, the first electronic device 100-2 may recognize that the first electronic device 100-2 is out of the first short-range communication range with the second electronic device 102. As another example, when the strength of a signal from the second electronic device 102 according to the first short-range communication method is equal to or lower than the reference strength for a reference time, the first electronic device 100-2 may recognize that the first electronic device 100-2 is out of the first short-range communication range with the second electronic device 102. The first short-range communication may be identical to or different from the second short-range communication. The missing-child occurrence alert message may include at least one of a packet ID, an alert ID, a public flag, an emergency situation type, time information, position information, a delivery count, or a delivery time.

Electronic devices 104, 106, 108, 110 and 112 located between the first electronic device 100-2 and the second electronic device 102 may relay the missing-child occurrence alert message broadcast by the first electronic device 100-2 through the second short-range communication network to the second electronic device 102. For example, the electronic devices 104, 108 and 110 which had received the missing-child occurrence alert message broadcast by the first electronic device 100-2 through the second short-range communication network may again broadcast the missing-child occurrence alert message through the second short-range communication network. In this case, the electronic devices 104, 108 and 110 may determine whether the destination of the missing-child occurrence alert message is directed to the electronic devices 104, 108 and 110 themselves based on the alert ID included in the missing-child occurrence alert message. When the first electronic device 100-2 and the second electronic device 102 generate the alert ID by using a random number, the electronic devices 104, 108 and 110 may not identify the unique identification information of the first electronic device 100-2 and the second electronic device 102 based on the alert ID included in the missing-child occurrence alert message.

As described above, when the missing-child occurrence alert message is broadcast, the electronic devices 104, 108 and 110 may add the position information of the electronic devices themselves to the missing-child occurrence alert message. For example, when the missing-child occurrence alert message received through the second short-range communication network does not include position information, the third electronic device 104 may add the position information of the third electronic device 104 to the missing-child occurrence alert message and broadcast the same through the second short-range communication network.

When receiving the missing-child occurrence alert message broadcast by the sixth electronic device 110 through the second short-range communication network, the second electronic device 102 may identify the missing-child occurrence alert message for the first electronic device 100-2 based on the alert ID of the missing-child occurrence alert message. In this case, the second electronic device 102 may display missing-child occurrence information for the first electronic device 100 together with the position information included in the missing-child occurrence alert message on a display unit. Additionally, the second electronic device 102 may generate a missing-child occurrence alert sound.

Figure 2:
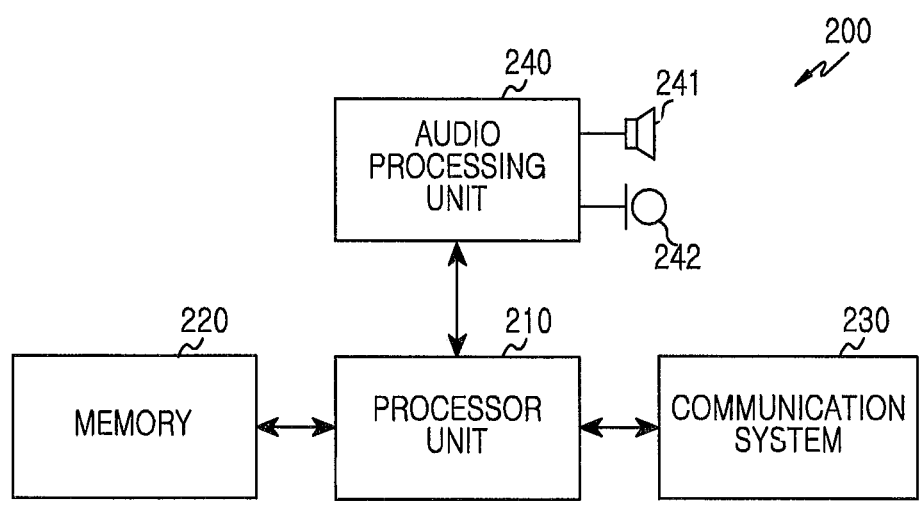
FIG. 2 illustrates a block diagram of an electronic device according to an embodiment of the present disclosure.

As described above, the first electronic device 100 is for missing-child prevention and may be configured as illustrated in FIG. 2 so as to support a missing-child prevention function.

FIG. 2 illustrates a block diagram of an electronic device according to an exemplary embodiment of the present disclosure.

Referring to FIG. 2, the electronic device 200 may include a processor unit 210, a memory 220, and a communication system 230.

The memory 220 may include a program storage unit for storing a program for controlling an operation of the electronic device 200, and a data storage unit for storing data generated during the execution of a program. For example, the program storage unit may include a communication control program and an emergency information generation program.

The communication control program includes at least one software component for performing control to perform short-range communication with a counterpart electronic device through the communication system 230. For example, the communication control program may perform control to establish a short-range communication link with the counterpart electronic device through the communication system 230. In this case, the communication control program may generate an alert ID for identifying the short-range communication link with the counterpart electronic device. For example, the communication control program may generate the alert ID for the short-range communication link by applying a random number to the unique identification information of at least one electronic device of the electronic device 200 and the counterpart electronic device. As another example, the communication control program may set the unique identification information of the counterpart electronic device, with which the short-range communication link is established, as the alert ID. In this case, the unique identification information may include at least one of a MAC address, a MEID, an IMEI or a telephone number.

The communication control program may perform control to broadcast a missing-child occurrence alert message generated through the emergency information generation program toward the near-field communication area via the short-range communication network when the electronic device 200 is out of a short-range communication range with the counterpart electronic device. For example, when the strength of a signal from the counterpart electronic device through the short-range communication link is equal to or lower than a reference strength, the communication control program may recognize that the electronic device 200 is out of the short-range communication range with the counterpart electronic device. As another example, when the strength of a signal from the counterpart electronic device through the short-range communication link is equal to or lower than the reference strength for a reference time, the communication control program may recognize that the electronic device 200 is out of the short-range communication range with the counterpart electronic device. In this case, the communication control program may perform control to transmit the missing-child occurrence alert message by using a near-field communication method equal to or different from the near-field communication method with the counterpart electronic device.

In addition, the communication control program may control to again transmit the missing-child occurrence alert message. For example, when a response signal is not received in response to the missing-child occurrence alert message after the missing-child occurrence alert message is broadcast through the short-range communication network, the communication control program may perform control to retransmit the missing-child occurrence alert message. In this case, the communication control program may transmit the missing-child occurrence alert message repeatedly until the number of times of transmission reaches a reference number.

The emergency information generation program includes at least one software component for generating an emergency signal. For example, when the electronic device 200 is out of the short-range communication range with the counterpart electronic device, the emergency information generation program may generate the emergency signal including variables as provided in Table 1 under the control of the communication control program.

TABLE 1

| variables | description |
| --- | --- |
| packet ID | an unique number of packet (packet duplication prevention) |
| alert ID | an unique value indicating destination of packet |
| public flag | a flag indicating whether a packet is needed to be identified in an electronic device for relaying the packet |
| type | emergency situation type |
| create time | a time at which packet is initially transmitted (broadcast) |
| timestamp | a time at which a packet is transmitted in an electronic device (packet duplication prevention) |
| delivery number & Location | location information and information about electronic devices which add the location information |
| delivery count | the number of times of packet delivery |
| TTL (Time To Live) | a time for which a packet needs to be forwarded or the times of effective packet deliveries |

The alert ID of Table 1 may be generated by the communication control program in order to identify the short-range communication link with the counterpart electronic device. For example, the alert ID may be generated by applying a random number to the unique identification information of at least one electronic device of electronic devices connected to each other through the short-range communication link. Accordingly, when the emergency signal is transmitted through the short-range communication, an electronic device that knows the random number used to generate the alert, ID only decodes the alert ID and identifies the emergency signal.

The public flag may be set according to emergency signal types. For example, when there is a need to inform electronic devices, which relay the emergency signal, of the content of the emergency signal, for example, disaster or crime prevention, the public flag may be set to an active mode such that the electronic devices which relay the emergency signal identify a relevant packet.

The emergency information generation program may generate a missing-child occurrence alert message of which the type of the emergency signal is set to "missing-child occurrence" when the electronic device 200 is out of the short-range communication range with the counterpart electronic device.

The data storage unit may include alert ID information for the short-range communication link established through the communication control program.

The processor unit 210 enables the electronic device 200 to provide various services using at least one software program. In this case, the processor 210 executes at least one program stored in the memory 220 and provides a service corresponding to the program. For example, the processor unit 210 may execute the communication control program stored in the memory 220 to perform short-range communication with the counterpart electronic device through the communication system 230. The processor unit 210 may perform control to broadcast a missing-child occurrence alert message generated by executing the emergency information generation program through the short-range communication network when the electronic device 200 is out of a short-range communication range with the counterpart electronic device. In this case, the processor unit 210 may execute the emergency information generation program stored in the memory 220 to generate the missing-child occurrence alert message including at least one variable of the variables as in Table 1.

The communication system 230 transmits and receives a signal according to at least one short-range communication method. For example, the communication system 230 may support near-field wireless communication with the counterpart electronic device using at least one short-range communication method of infrared wireless communication, Bluetooth communication, Zigbee or wireless LAN communication.

In addition, the electronic device 200 may further include an audio processing unit 240 for providing an audio interface between a user and the electronic device 200 through a speaker 241 and a microphone 242. For example, the audio processing unit 240 may generate an alert sound through the speaker 241 when the electronic device 200 is out of the short-range communication range with the counterpart electronic device, In addition, the audio processing unit 240 may collect surrounding information through the microphone 242 when the electronic device 200 is out of the short-range communication range with the counterpart electronic device.

Figure 3:
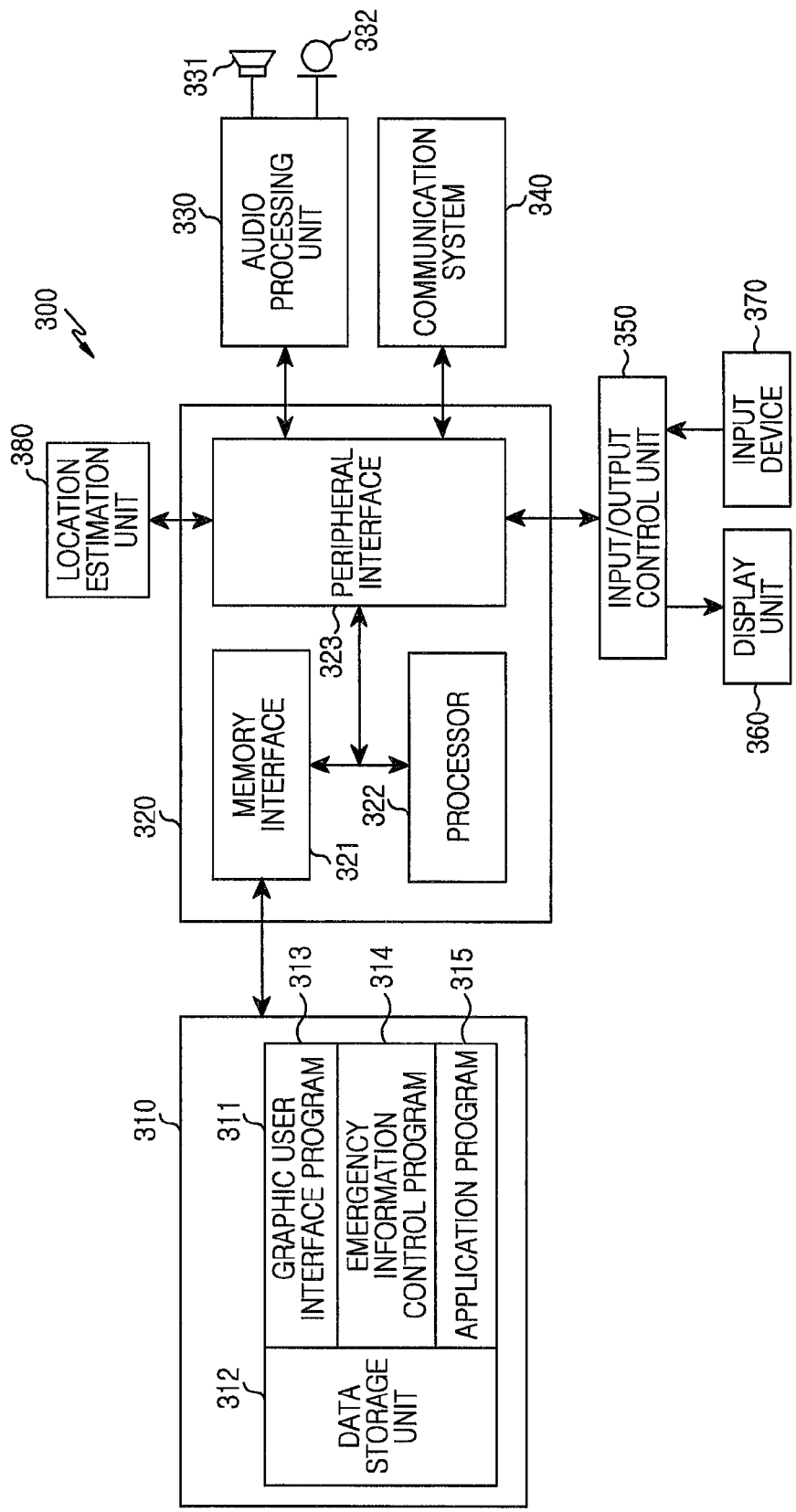
FIG. 3 illustrates a detailed block diagram of a processor according to an embodiment of the present disclosure.

FIG. 3 illustrates a block diagram of an electronic device according to another embodiment of the present disclosure.

Referring to FIG. 3, the electronic device 300 includes a memory 310, a processor unit 320, an audio processing unit 330, a communication system 340, an input/output control unit 350, a display unit 360, an input device 370, and a position estimation unit 380. In this case, the memory 310 may be provided in plurality.

The memory 310 may include a program storage unit 311 for storing a program for controlling an operation of the electronic device 300, and a data storage unit 312 for storing data generated during the execution of a program.

For example, the program storage unit 311 includes a Graphic User Interface (GUI) program 313, an emergency information control program 314, and at least one application program 315. In this case, the programs stored in the program storage unit 311 may be expressed as an instruction set that is a collection of instructions.

Figure 13A:
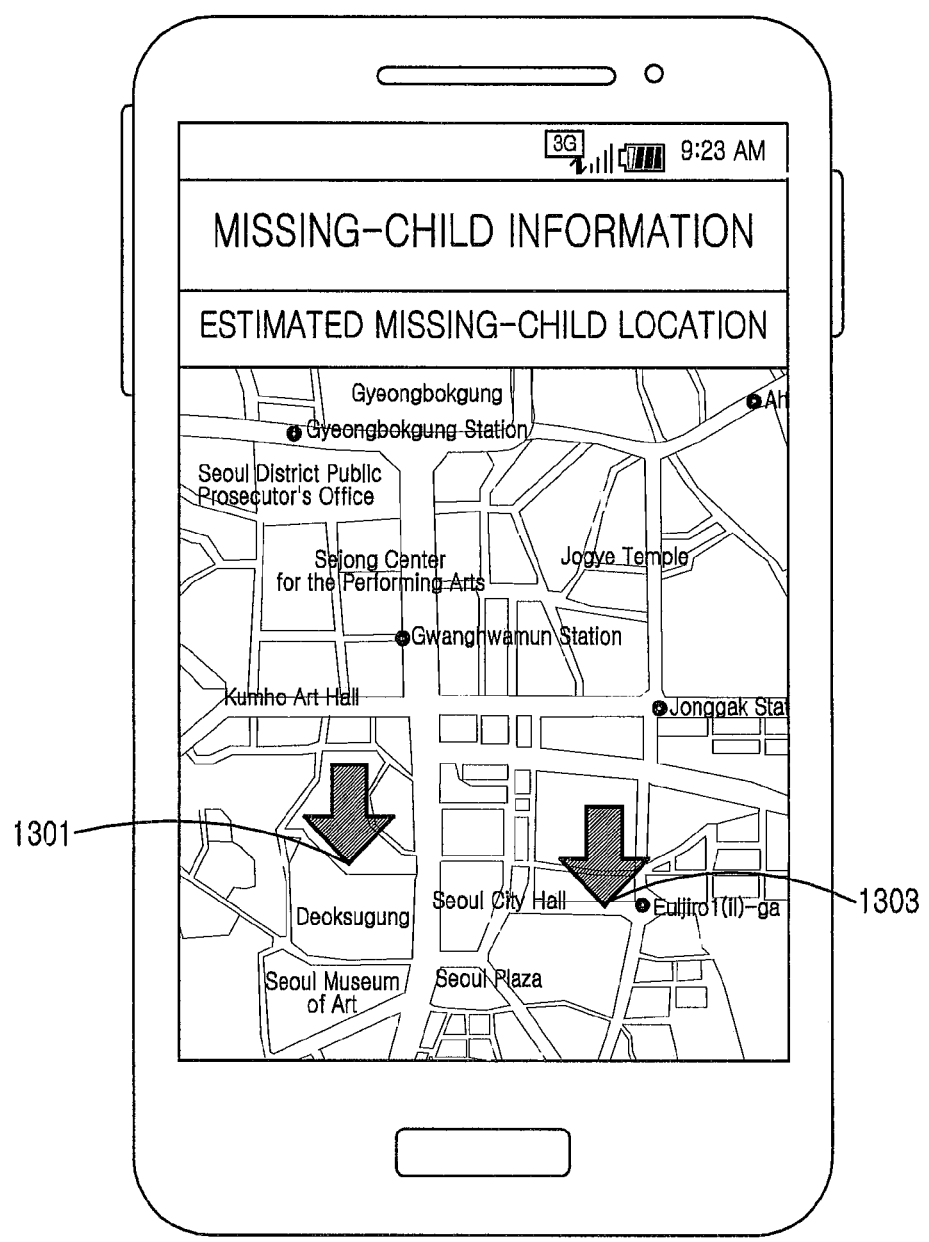
FIGS. 13A to 13C illustrate screen configurations of displaying emergency information in an electronic device according to an embodiment of the present disclosure.
Figure 13B:
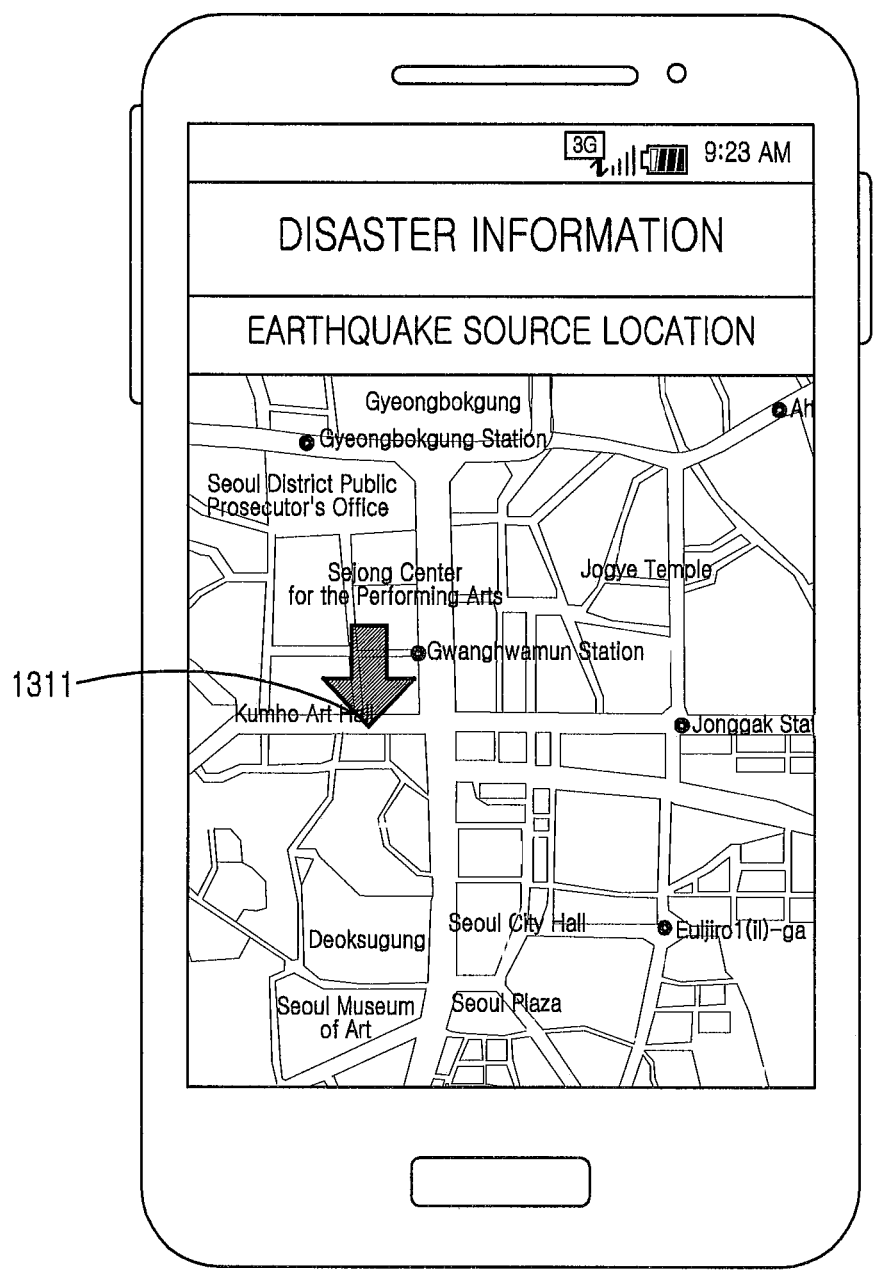
Figure 13C:
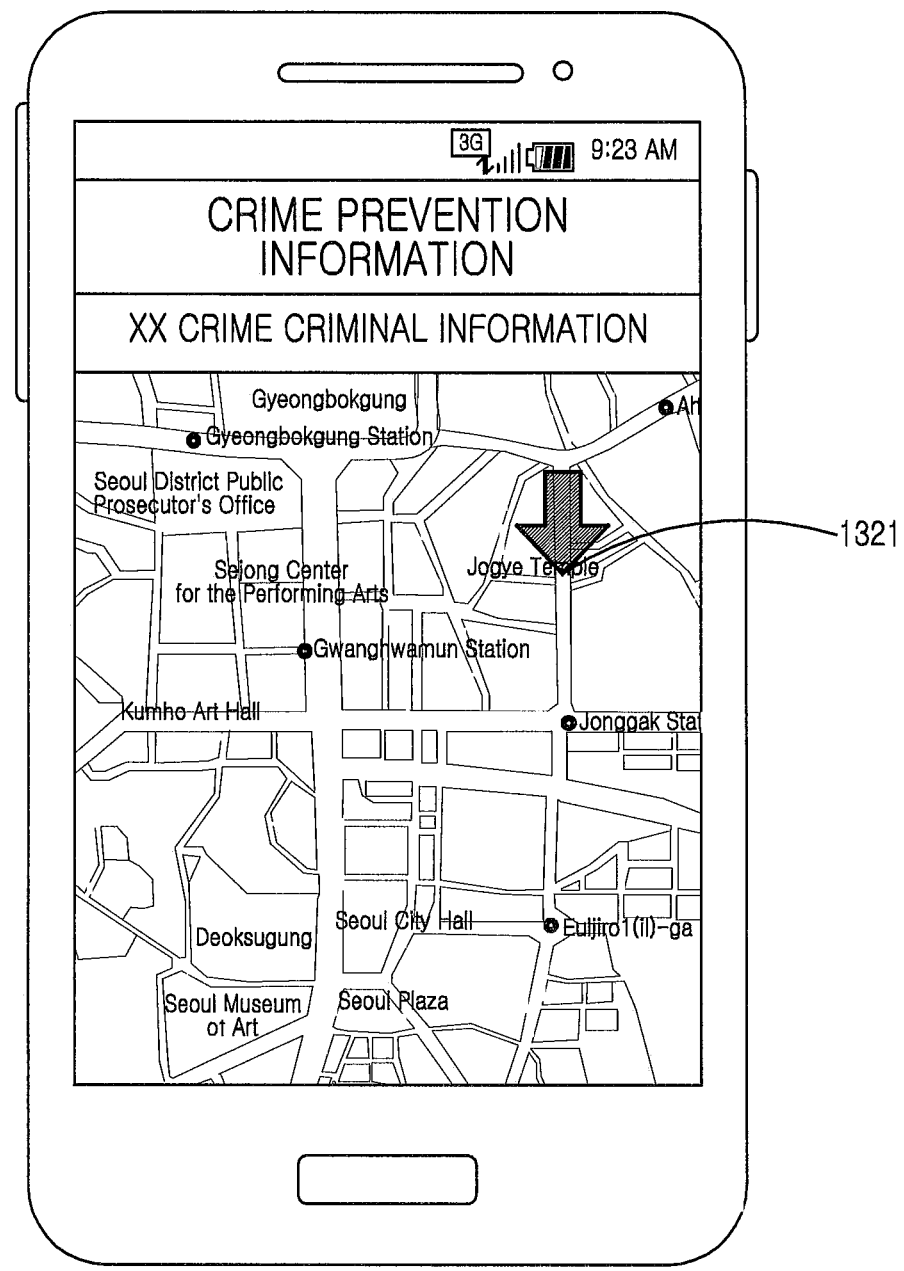

The GUI program 313 may include at least one software component for providing a graphic user interface on a display unit 360. For example, the GUI program 313 may perform control to display information about application programs executed by the processor 322 on the display unit 360. As another example, the GUI program 313 may perform control to display emergency information and location information at which an emergency situation occurs which are identified by the emergency information control program 314 on the display unit 360 as illustrated in FIG. 13A to FIG. 13C.

The emergency information control program 314 may include at least one software component for controlling transmission and reception of the emergency signal through the communication system 340. For example, when the emergency signal is received through the communication system 340, the emergency information control program 314 may identify the destination of the emergency signal based on the alert ID of the emergency signal. In this case, the emergency information control program 314 may perform control to transmit a response signal for the emergency signal through the communication system 340.

When the destination of the emergency signal is the electronic device 300, the emergency information control program 314 may identify the type of an emergency situation and location information in which the emergency situation occurs which are included in the emergency signal.

When the destination of the emergency signal is not the electronic device 300, the emergency information control program 314 may determine whether the emergency signal is permitted to be transmitted. For example, the emergency information control program 314 may determine whether the emergency signal is repeatedly received in consideration of the packet ID information and timestamp information of the emergency signal. When the emergency signal is repeatedly received, the emergency information control program 314 may determine not to transmit the emergency signal. As another example, the emergency information control program 314 may identify the validity of the emergency signal in consideration of the TTL information of the emergency signal. When the emergency signal is not valid, the emergency information control program 314 may determine not to transmit the emergency signal.

When the emergency signal is permitted to be transmitted, the emergency information control program 314 may perform control to broadcast the emergency signal toward the short-range communication area through the communication system 340. That is, the emergency information control program 314 may relay the emergency signal through the communication system 340 in the short-range communication area. In this case, the emergency information control program 314 may add the location information of the electronic device 300 to the emergency signal. For example, when the emergency signal does not include the location information, the emergency information control program 314 may add the location information of the electronic device 300 which is estimated by the location estimation unit 380 to the emergency signal.

The emergency information control program 314 may perform control to establish a short-range communication link with a counterpart electronic device through the communication system 340. In this case, the emergency information control program 314 may generate an alert ID for identifying the short-range communication link with the counterpart electronic device. For example, the emergency information control program 314 may generate the alert ID for the short-range communication link by applying a random number to the unique identification information of at least one electronic device of the electronic device 300 and the counterpart electronic device. As another example, the emergency information control program 314 may set the unique identification information of the counterpart electronic device, with which the short-range communication link is established, as the alert ID. In this case, the unique identification information may include at least one of a MAC address, a MEID, an IMEI or a telephone number.

The emergency information control program 314 may perform control to broadcast the emergency signal toward the short-range communication area by using the communication system 340 when an emergency event occurs. For example, the emergency information control program 314 may perform control to broadcast the emergency signal toward the short-range communication area by using the communication system 340 when an emergency signal generation menu is selected according to input information provided from the input device 370. As another example, the emergency information control program 314 may perform control to broadcast the emergency signal toward the short-range communication area by using the communication system 340 when it is determined that the electronic device 300 is out of a limited movement area or enters a restricted zone based on the location information of the electronic device 300 which is estimated by the location estimation unit 380. In this case, the emergency information control program 314 may perform control to transmit the emergency signal including the location information of the electronic device 300 which is estimated by the location estimation unit 380.

The application program 315 includes a software component for at least one application program installed in the electronic device 300.

The processor unit 320 may include a memory interface 321, at least one processor 322, or a peripheral interface 323. In this case, the memory interface 321, the at least one processor 322, and the peripheral interface 323 which are included in the processor unit 320 may be integrated into at least one integrated circuit or be implemented as separate components.

The memory interface 321 controls access to the memory 310 of components, such as the processor 322 or the peripheral interface 323.

The peripheral interface 323 controls connections of the input/output peripherals of the electronic device 300 to the processor 322 and the memory interface 321.

The processor 322 enables the electronic device 300 to provide various multimedia services using at least one software program. In this case, the processor 322 performs control to execute at least one program stored in the memory 310 and provide a service corresponding to the program.

The audio processing unit 330 provides an audio interface between a user and the electronic device 300 through a speaker 331 and a microphone 332. For example, when the emergency information control program 314 identifies that the destination of the emergency signal is the electronic device 300, the audio processing unit 330 may generate an alert sound for the emergency information through the speaker 331.

The communication system 340 transmits and receives a signal according to at least one short-range communication method. For example, the communication system 340 may support near-field wireless communication with the counterpart electronic device using at least one short-range communication method of infrared wireless communication, Bluetooth communication, Zigbee or wireless LAN communication.

The input/output control unit 350 provides an interface between an input/output device, such as the display unit 360 and the input device 370, and the peripheral interface 323.

The display unit 360 displays the state information of the electronic device 300, characters input by the user, moving pictures, still pictures, or the like. For example, the display unit 360 displays information about application programs executed by the processor 322. As another example, the display unit 360 may display emergency information and location information at which an emergency situation occurs which are identified by the emergency information control program 314 as illustrated in FIG. 13A to FIG. 13C.

The input device 370 provides input data generated by the selection of the user to the processor unit 320 through the input/output control unit 350. In this case, the input device 370 includes a keypad including at least one hardware button, a touch pad for detecting touch information, and the like. For example, the input device 370 provides touch information generated by one or more of a touch pen, a finger and a glove worn on a finger on a touchpad to the processor 322 through the input/output control unit 350.

The location estimation unit 380 estimates the location of the electronic device 300. For example, the location estimation unit 380 may estimate the location of the electronic device 300 based on a satellite signal provided from a satellite according to a global navigation satellite system (GNSS). As another example, the location estimation unit 380 may estimate the location of the electronic device 300 by using at least one neighboring base station.

As described above, the electronic device 300 may relay the emergency signal received through the communication system 340 toward the short-range communication area. In this case, the processor 322 of the electronic device 300 may be configured as illustrated in FIG. 4 in order to reduce power consumption due to relay of the emergency signal.

Figure 4:
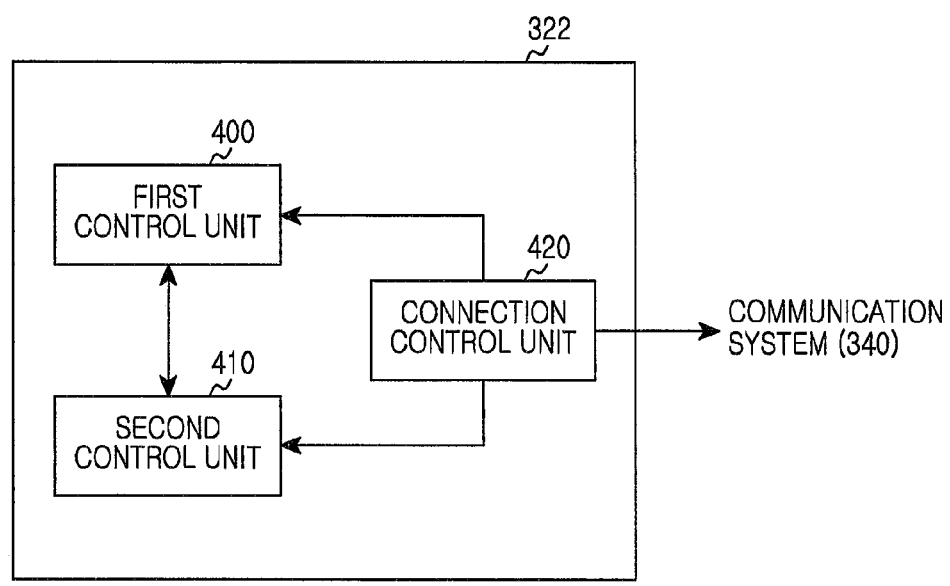
FIG. 4 illustrates a block diagram of an electronic device according to an embodiment of the present disclosure.

FIG. 4 illustrates a detailed block diagram of a processor according to an exemplary embodiment of the present disclosure.

As illustrated in FIG. 4, the processor 322 may include a first control unit 400, a second control unit 410, and a connection control unit 420.

The first control unit 400 controls the overall operation of the electronic device 300 and enables the electronic device 300 to provide various multimedia services using at least one software program. That is, the first control unit 400 may control the overall operation of the electronic device 300 when the electronic device 300 is in an active mode. For example, when the electronic device 300 that is in the active mode receives an emergency signal through the communication system 340, the first control unit 400 may analyze the emergency signal and perform control to display emergency information or to broadcast the emergency signal toward a short-range communication area.

The second control unit 410 may perform control when the electronic device 300 is in a freeze mode. That is, the second control unit 410 may perform control to switch the electronic device 300 to the active mode when a service request is detected during a sleep mode. However, when the electronic device 300 that is in the sleep mode receives an emergency signal through the communication system 340, the second control unit 410 may analyze the emergency signal and perform control to broadcast the emergency signal toward the short-range communication area. That is, the second control unit 410 may broadcast the emergency signal toward the short-range communication area without switching the electronic device 300 to the active mode. When the destination of the emergency signal is the electronic device 300, the second control unit 410 may switch the electronic device 300 to the active mode in order to display emergency information and a location at which the emergency information is generated.

The connection control unit 240 performs control to transmit the emergency signal provided from the communication system 340 to the first control unit 400 or the second control unit 410 according to the operating mode of the electronic device 300. For example, when the electronic device 300 is in the active mode, the connection control unit 420 may perform control to transmit the emergency signal provided from the communication system to the first control unit 400. As another example, when the electronic device 300 is in the sleep mode, the connection control unit 420 may perform control to transmit the emergency signal provided from the communication system to the second control unit 410.

Figure 5:
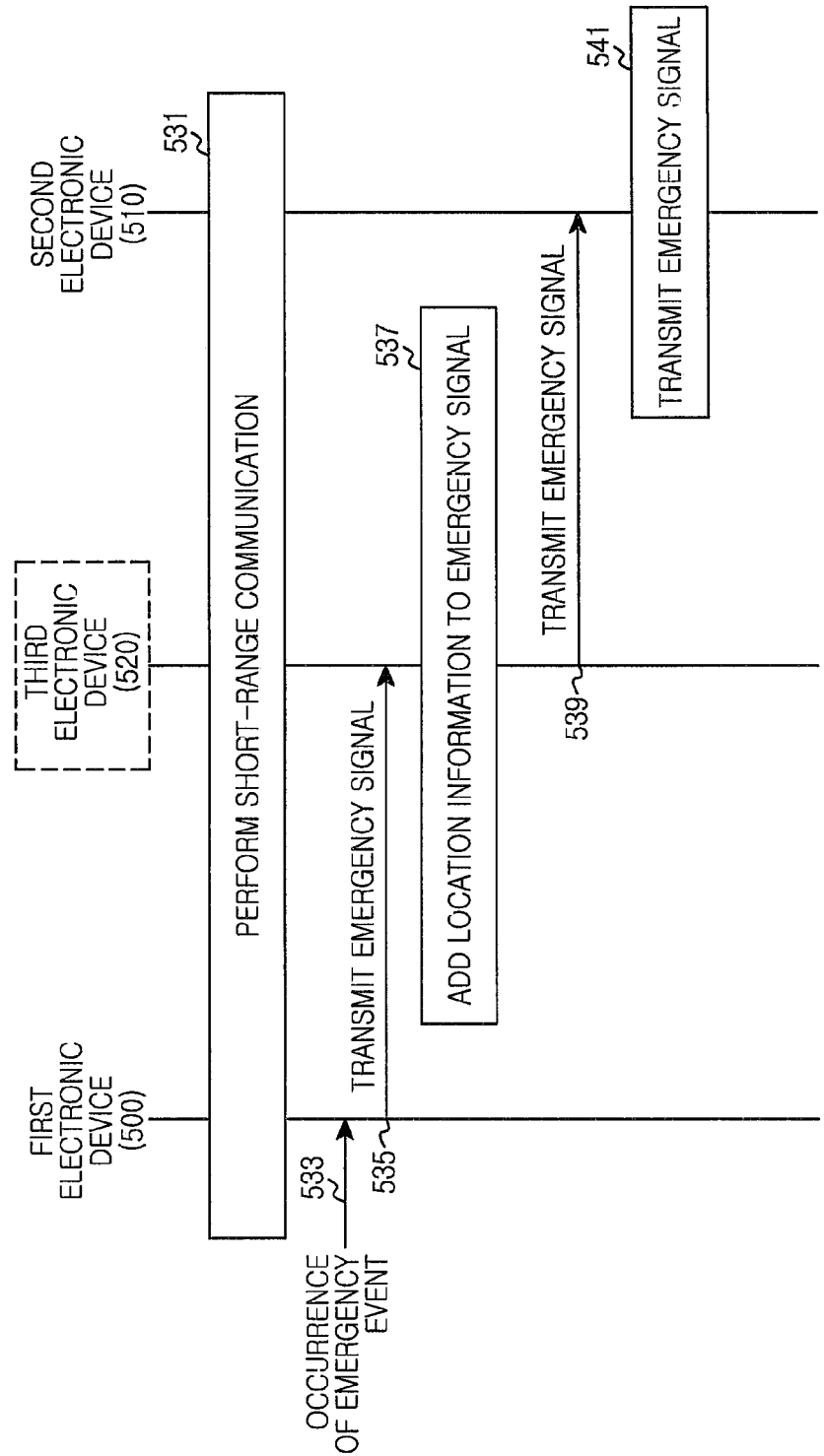
FIG. 5 illustrates a flowchart for a process of transmitting location information of a missing child using short-range communication according to an embodiment of the present disclosure.

FIG. 5 illustrates a flowchart for a process of transmitting location information of a missing child using short-range communication according to an embodiment of the present disclosure. In the following description, a third electronic device may include at least one electronic device that relays an emergency signal.

Referring to FIG. 5, a first electronic device 500 carried by a child and a second electronic device 510 carried by a parent may establish a short-range communication link according to a short-range communication method in a communication system (step 501). For example, the first electronic device 500 and the second electronic device 510 may establish the short-range communication link according to a Bluetooth method. When the short-range communication link is established, the first electronic device 500 and the second electronic device 510 may generate an alert ID for identifying the short-range communication link. For example, the first electronic device 500 and the second electronic device 510 may generate the alert ID for the short-range communication link by applying a random number to the unique identification information of at least one of the first electronic device 500 or the second electronic device 510. Alternatively, the first electronic device 500 and the second electronic device 510 may set the unique identification information of their counterpart electronic devices as the alert ID for the short-range communication link. In this case, the unique identification information may include at least one of a MAC address, a MEID, an IMEI or a telephone number.

The first electronic device 500 determines whether an emergency event occurs. For example, the first electronic device 500 may recognize that there occurs an emergency event in which the first electronic device 500 is out of a short-range communication range with the second electronic device 510 when the strength of a signal from the second electronic device 510 is equal to or lower than a reference strength. As another example, the first electronic device 500 may recognize that there occurs an emergency event in which the first electronic device 500 is out of the short-range communication range with the second electronic device 510 when the strength of a signal from the second electronic device 510 is equal to or lower than the reference strength for a reference time.

When the emergency event occurs in the first electronic device 500 (step 533), the first electronic device 500 broadcasts an emergency signal including the alert ID through a short-range communication network (step 535). In this case, the first electronic device 500 may broadcast the emergency signal by using a near-field communication method equal to or different from the near-field communication method with the second electronic device 510. For example, when the short-range communication link is established with the second electronic device 510 using Bluetooth communication, the first electronic device 500 may broadcast the emergency signal through a Bluetooth communication network. As another example, when the short-range communication link is established with the second electronic device 510 using Bluetooth communication, the first electronic device 500 may broadcast the emergency signal through a wireless LAN. In this case, the emergency signal may include a missing-child occurrence alert message.

In step 537, the third electronic device 520 adds the location information of the third electronic device 520 when receiving the emergency signal through the short-range communication network. That is, when it is, identified the third electronic device 520 is not the destination of the emergency signal of the third electronic device 520 based on the alert ID of the emergency signal, the third electronic device 520 may add the location information of the third electronic device 520 to the emergency signal. For example, when the emergency signal including no location information is permitted to be transmitted toward the short-range communication area, the third electronic device 520 may add the location information of the third electronic device 520 to the emergency signal. In this case, the third electronic device 520 may add the delivery count and location information of the emergency signal to the emergency signal or updates the same. When the third electronic device 520 may not estimate the location information, the third electronic device 520 may update only the delivery count of the emergency signal.

In step 539, the third electronic device 520 may broadcast the emergency signal by using the short-range communication. In addition, the third electronic device 520 may transmit a response signal for the emergency signal to the first electronic device 500 or another third electronic device 520.

In step 541, the second electronic device 510 may extract and display the emergency information and the location information included in the emergency signal on a display unit when receiving the emergency signal through the short-range communication network. For example, when receiving the emergency signal through the short-range communication network, the second electronic device 510 may identify the destination of the emergency signal by comparing the alert ID of the emergency signal with the alert ID of the short-range communication link with the first electronic device 500. When the second electronic device 510 is the destination of the emergency signal, the second electronic device 510 may display missing-child occurrence information and an estimated missing-child location 1301 which are extracted from the emergency signal on a map as illustrated in FIG. 13A. In this case, the second electronic device 510 may display the location 1303 of the second electronic device 510 together with the estimated missing-child location 1301.

As described above, when the short-range communication link is established between the first electronic device 500 and the second electronic device 510, the first electronic device 500 may enable the second electronic device 510 to generate an alert event through the short-range communication network. For example, the first electronic device 500 may enable the second electronic device 510 to generate an alert sound through the short-range communication network or to turn on a mars light.

In the above-described embodiment, the second electronic device 510 maintains the short-range communication link with the first electronic device 500 in order to determine whether the first electronic device 500 is out of a reference range (short-range communication area).

According to another embodiment, the first electronic device 500 may measure a distance from the second electronic device 510 by using a short-distance measurement sensor to generate an emergency event.

Figure 6:
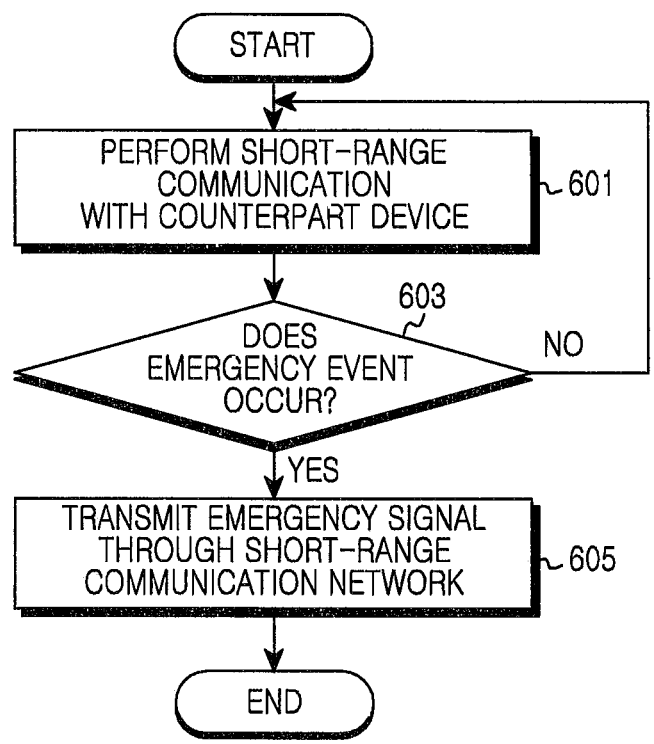
FIG. 6 illustrates a flowchart for a process of transmitting a missing-child occurrence signal using short-range communication in an electronic device according to an embodiment of the present disclosure.

FIG. 6 illustrates a flowchart for a process of transmitting a missing-child occurrence signal using short-range communication in an electronic device according to an embodiment of the present disclosure. The following description may include the operation flow of the first electronic device 500 carried by a missing-child which is illustrated in FIG. 5.

Referring to FIG. 6, in step 601, the electronic device establishes a short-range communication link with a counterpart electronic device and performs short-range communication with the counterpart electronic device. For example, the electronic device may establish a short-range communication link with the counterpart electronic device according to a Bluetooth method. In this case, the electronic device may generate an alert ID for identifying the short-range communication link with the counterpart electronic device.

In step 603, the electronic device determines whether an emergency event occurs. For example, when the strength of a signal from the counterpart electronic device is equal to or lower than a reference strength, the electronic device may recognize that there occurs an emergency event in which the electronic device is out of the short-range communication range with the counterpart electronic device. As another example, when the strength of a signal from the counterpart electronic device is equal to or lower than the reference strength for a reference time, the electronic device may recognize that there occurs an emergency event in which the electronic device is out of the short-range communication range with the counterpart electronic device.

When the emergency event does not occur, the electronic device proceeds to step 601 and maintains the short-range communication with the counterpart electronic device.

When the emergency event occurs, the electronic device proceeds to step 605, and generates an emergency signal including an alert ID for identifying the short-range communication with the counterpart electronic device and broadcasts the emergency signal toward the short-range communication area. In this case, the electronic device may transmit the emergency signal using a short-range communication method identical to or different from the short-range communication method with the counterpart electronic device. For example, when the short-range communication link is established with the counterpart electronic device using Bluetooth communication, the electronic device may broadcast the emergency signal through a Bluetooth communication network. As another example, when the short-range communication link is established with the counterpart electronic device using Bluetooth communication, the electronic device may broadcast the emergency signal through a wireless LAN.

Figure 7:
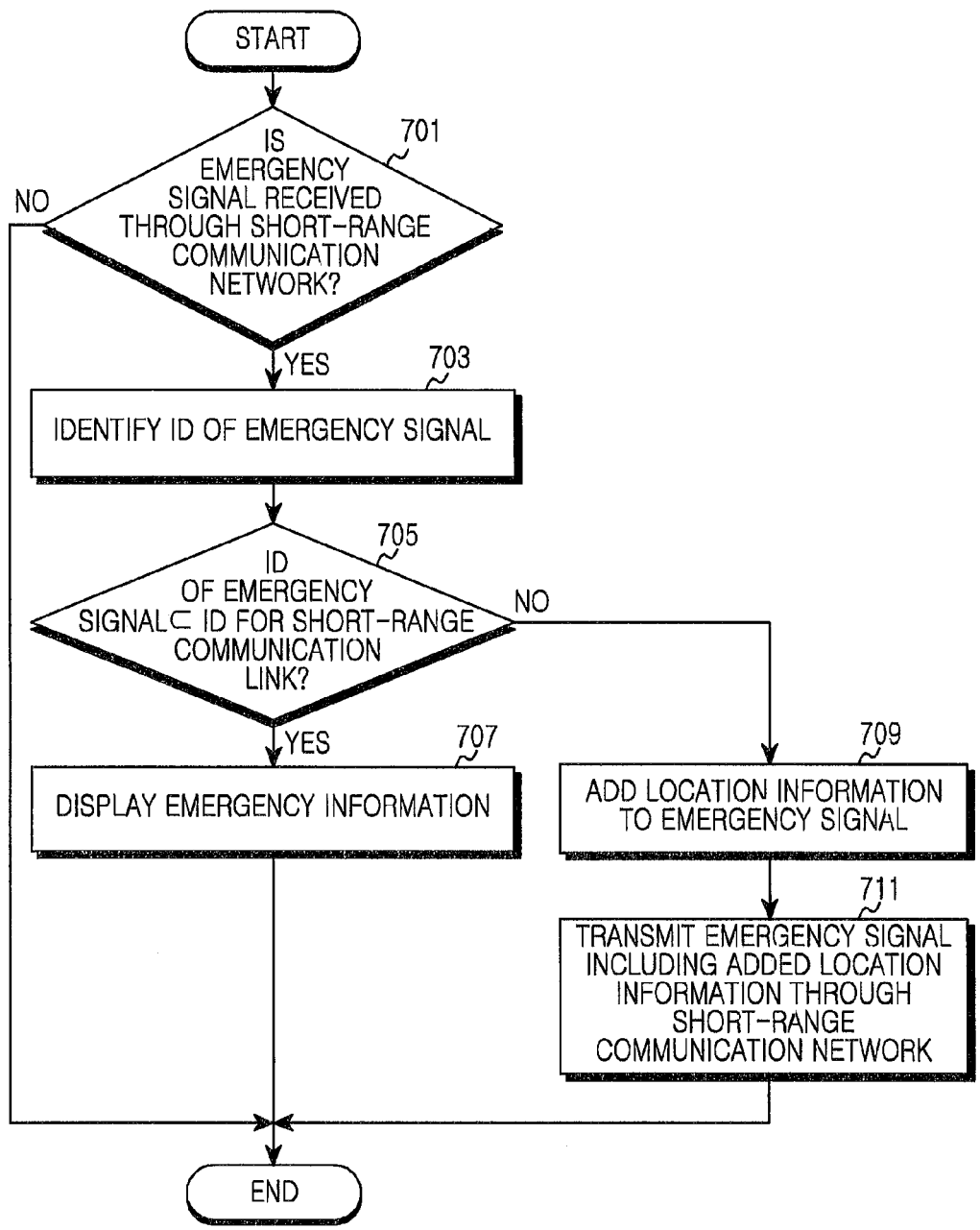
FIG. 7 illustrates a flowchart for a process of identifying missing-child location information using short-range communication in an electronic device according to an embodiment of the present disclosure.

FIG. 7 illustrates a flowchart for a process of identifying missing-child location information using short-range communication in an electronic device according to an embodiment of the present disclosure. The following description may include the operating process of the second electronic device 510 or the third electronic device 520 illustrated in FIG. 5.

Referring to FIG. 7, in step 701, the electronic device determines whether an emergency signal is received through a short-range communication network.

When the emergency signal is not received through the short-range communication network, the electronic device may end the algorithm.

When the emergency signal is received through the short-range communication network, the electronic device identifies an ID of the emergency signal in step 703. For example, in a case where the emergency signal includes the variables listed in Table 1, the electronic device may identify the alert ID of the emergency signal.

In step 705, the electronic device determines whether the alert ID of the emergency signal is included in alert IDs for the short-range communication link stored in the electronic device.

When the alert ID of the emergency signal is included in the alert IDs for the short-range communication link stored in the electronic device, the electronic device displays emergency situation information and location information included in the emergency signal in step 707. For example, when the emergency signal includes the missing-child occurrence information, the electronic device may display missing-child occurrence information and estimated missing-child location 1301 which are extracted from the emergency signal as illustrated in FIG. 13A. In this case, the electronic device may display the location of the electronic device together with the estimated missing-child location 1301.

When the alert ID of the emergency signal is not included in the alert IDs for the short-range communication link stored in the electronic device, the electronic device recognizes that the emergency signal for relay is received. In step 709, the electronic device adds the location information of the electronic device to the emergency signal. In this case, the electronic device may perform addition of the delivery count of the emergency signal together with the location information.

In step 711, the electronic device broadcasts the emergency signal including the added location information by using short-range communication.

When the emergency signal is received through the short-range communication network as described above, the electronic device may transmit a response signal in response to the emergency signal. For example, when the emergency signal includes the identification information of the counterpart electronic device that has transmitted the emergency signal, the electronic device may transmit the response signal for the emergency signal to the counterpart electronic device that has transmitted the emergency signal. As another example, the electronic device may broadcast the response signal including at least one of the packet ID or alert ID of the emergency signal toward the short-range communication area.

In the above-described embodiment, when receiving the emergency signal through the short-range communication network, the electronic device may identify the ID of the emergency signal. When the electronic device determines whether the emergency signal is repeatedly received and it is determined that the emergency signal is not repeatedly received, the electronic device may identify the ID of the emergency signal.

Figure 8:
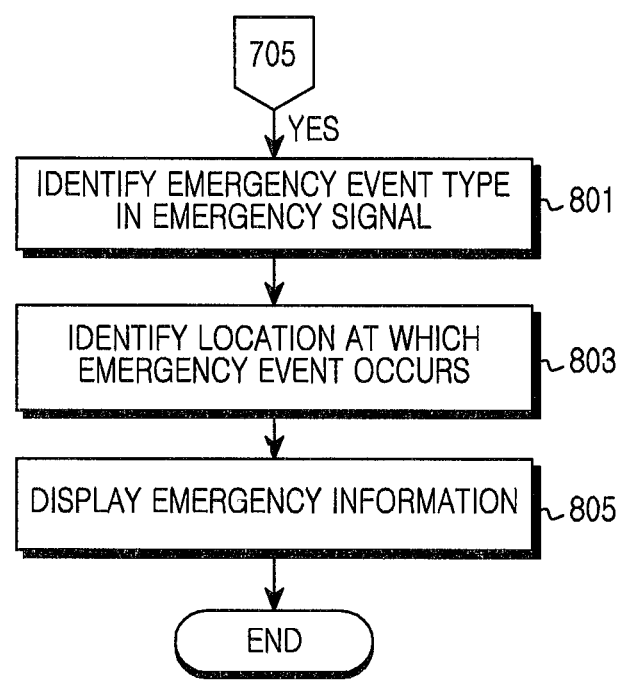
FIG. 8 illustrates a flowchart for a process for displaying missing-child location information in an electronic device according to an embodiment of the present disclosure.

FIG. 8 illustrates a flowchart for a process for displaying missing-child location information in an electronic device according to an embodiment of the present disclosure.

Referring to FIG. 8, when it is determined that the alert ID of the emergency signal is included in the alert IDs for the short-range communication link stored in the electronic device, the electronic device identifies an emergency event type in the emergency signal in step 801. For example, in a case where the emergency signal includes the variables listed in Table 1, the electronic device may identify emergency situation information included in the emergency signal based on the type information of the emergency signal.

In step 803, the electronic device identifies the location information included in the emergency signal. For example, in a case where the emergency signal includes the variables listed in Table 1, the electronic device may identify a location at which the emergency situation occurs based on the location information of the emergency signal.

When identifying the emergency situation information and the location information included in the emergency signal, the electronic device displays the emergency situation information and the location information on the display unit in step 805. For example, when the emergency signal includes the missing-child occurrence information, the electronic device may display missing-child occurrence information and estimated missing-child location 1301 which are extracted from the emergency signal as illustrated in FIG. 13A. In this case, the electronic device may display the location of the electronic device together with the estimated missing-child location 1301.

Figure 9:
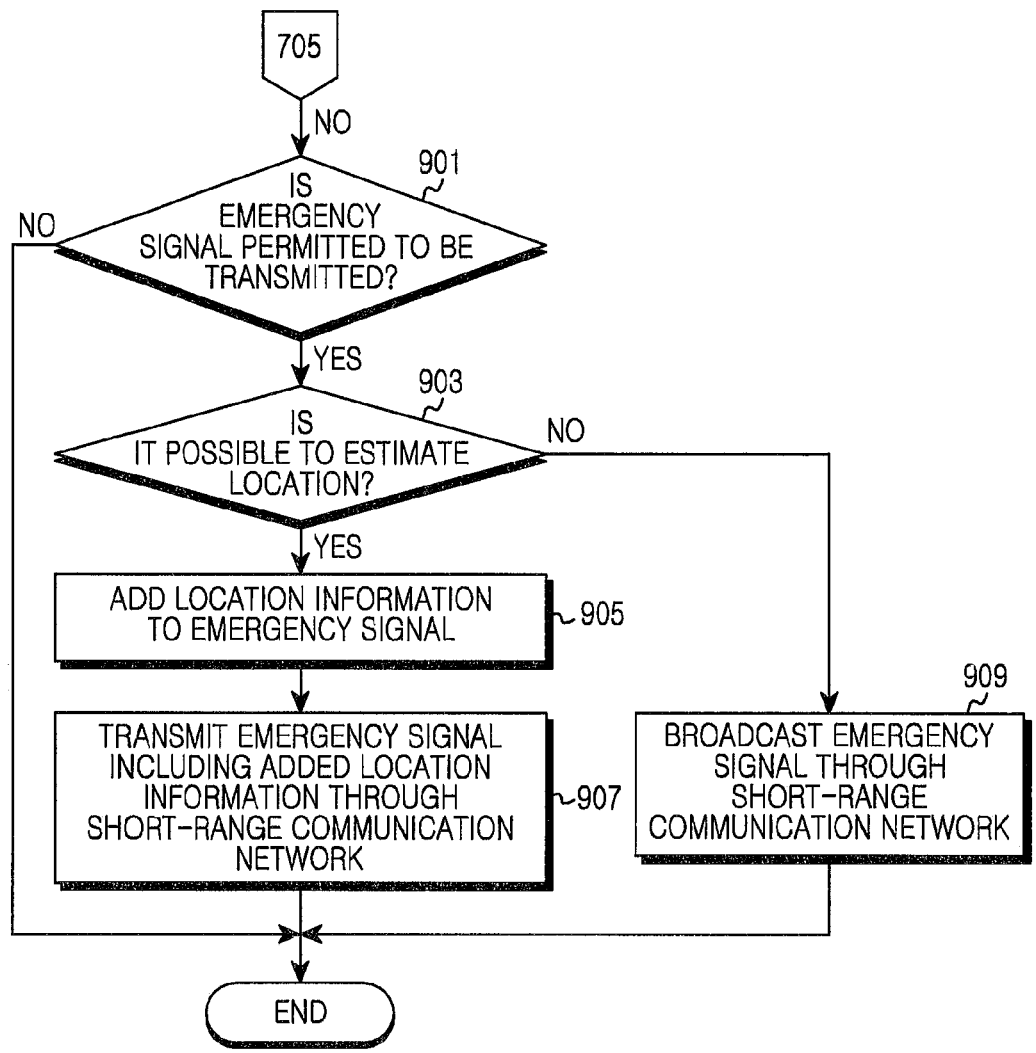
FIG. 9 illustrates a flowchart for a process for relaying missing-child location information in an electronic device according to an embodiment of the present disclosure.

FIG. 9 illustrates a flowchart for a process for relaying missing-child location information in an electronic device according to an embodiment of the present disclosure.

Referring to FIG. 9, when it is determined that the alert ID of the emergency signal is not included in the alert IDs for the short-range communication link stored in the electronic device in step 705 of FIG. 7, the electronic device determines whether the emergency signal is permitted to be transmitted additionally in step 901. For example, the electronic device may determine whether the emergency signal is repeatedly received in consideration of the packet ID information and timestamp information of the emergency signal. When the emergency signal is repeatedly received, the electronic device may determine not to transmit the emergency signal. As another example, the electronic device may determine whether the emergency signal is valid in consideration of the TTL information of the emergency signal. When the emergency signal is not valid, the electronic device may determine not to transmit the emergency signal. As another example, the electronic device may determine whether the emergency signal is repeatedly received and valid to determine whether the emergency signal is permitted to be transmitted additionally.

When the emergency signal is not transmitted additionally, the electronic device may end the algorithm.

When the emergency signal is permitted to be transmitted additionally, the electronic device determines whether location information is permitted to be added to the emergency signal in step 903. For example, the electronic device may determine whether it is possible to estimate the location of the electronic device. As another example, the electronic device may determine whether location information is included in the emergency signal.

When the location information is permitted to be added to the emergency signal, the electronic device adds the location information of the electronic device to the emergency signal in step 905. In this case, the electronic device may perform addition of the delivery count of the emergency signal together with the location information.

In step 907, the electronic device broadcasts the emergency signal having the added location information toward the short-range communication area by using short-range communication.

When the location information is not permitted to be added to the emergency signal, the electronic device broadcasts the emergency signal toward the short-range communication area by using the short-range communication in step 909.

When the missing-child occurrence information is relayed as illustrated, the electronic device broadcasts the missing-child occurrence information toward the short-range communication area according to the public flag of the emergency signal configured as illustrated in FIG. 1 without displaying the public flag on the display unit.

In the above-described embodiment, the electronic device may broadcast the emergency signal through the short-range communication network according to the short-range communication state with the counterpart electronic device in order to transmit the missing-child occurrence information.

Figure 10:
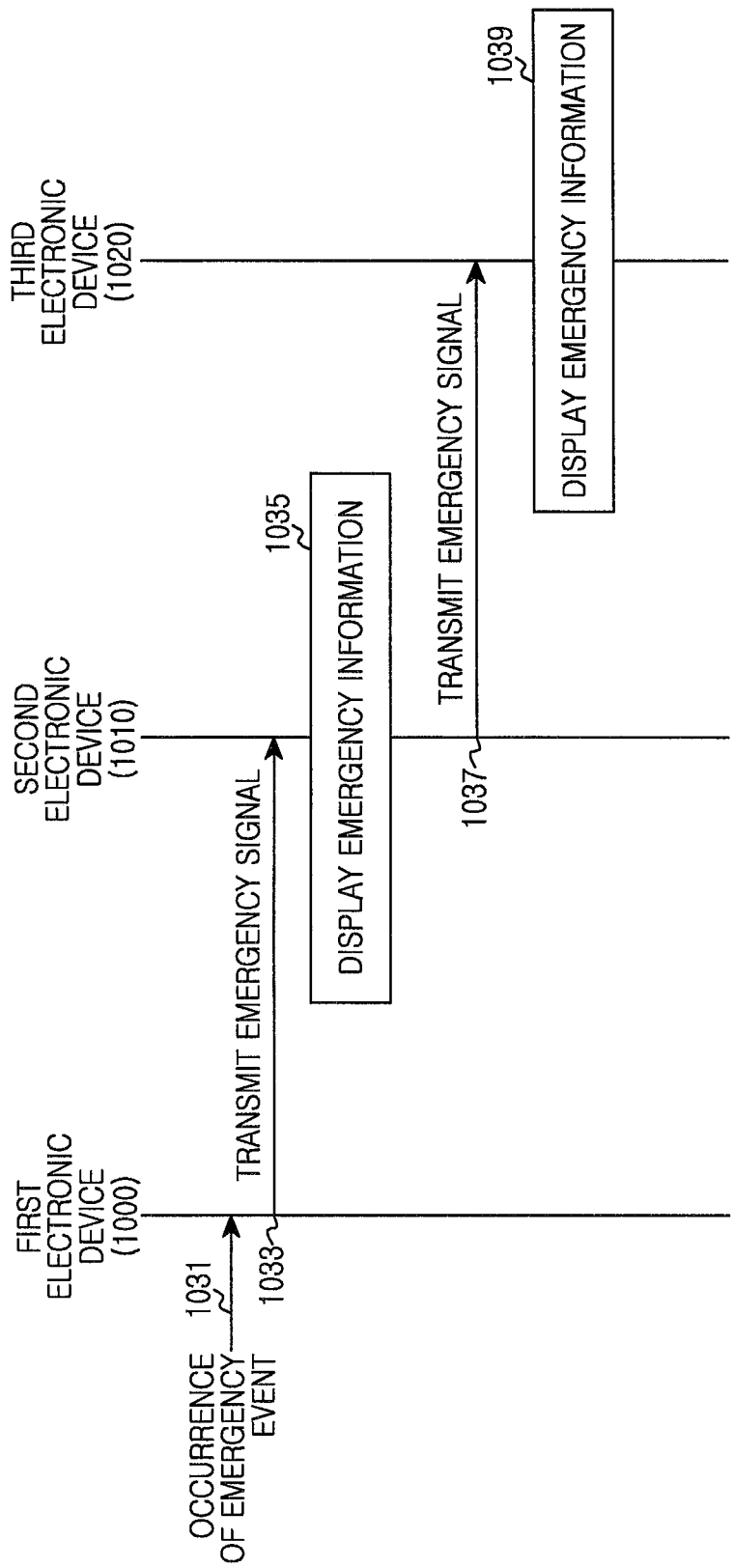
FIG. 10 illustrates a flowchart for a process of transmitting emergency information using short-range communication according to an embodiment of the present disclosure.

As another embodiment, the electronic device may broadcast the emergency signal through the short-range communication network in consideration of user's manipulation and the location information of the electronic device as illustrated in FIG. 10.

FIG. 10 illustrates a flowchart for a process of transmitting emergency information using short-range communication according to an embodiment of the present disclosure.

When there occurs an emergency event in a first electronic device 1000 in step 1031 as illustrated in FIG. 10, the first electronic device 1000 broadcasts the emergency signal through a short-range communication network in step 1033. When an emergency signal generation menu is selected according to input information provided from the input device 370, the first electronic device 1000 may broadcast an emergency signal toward the short-range communication area. In another example, when the first electronic device 1000 is out of a limited movement area or enters a restricted zone based on the location information of the first electronic device 1000 which is estimated by the location estimation unit 380, the first electronic device 1000 broadcasts the emergency signal toward the short-range communication area. In this case, the first electronic device 1000 may broadcast the emergency signal including the location information of the first electronic device 1000 toward the short-range communication area.

The second electronic device 1010 may determine whether the emergency signal is repeatedly received when the emergency signal is received through a short-range communication network. For example, the second electronic device 1010 may determine whether the emergency signal is repeatedly received in consideration of the packet ID information and timestamp information of the emergency signal. When the emergency signal is repeatedly received, the second electronic device 1010 may discard the emergency signal.

When the emergency signal is repeatedly received, the second electronic device 1010 displays the emergency information on the display unit according to the emergency situation information included in the emergency signal in step 1035. For example, when the emergency signal includes disaster information according to earthquake occurrence, the second electronic device 1010 displays earthquake occurrence information on the display unit on the display unit as illustrated in FIG. 13B. When the emergency signal includes location information at which the earthquake occurs, the second electronic device 1010 may display the location information 1311 at which the earthquake occurs on a map. As another example, when the emergency signal includes crime prevention information, the second electronic device 1010 displays criminals' location information on the display unit on the display unit as illustrated in FIG. 13C. In this case, the second electronic device 1010 may display the criminals' location information 1321 on a map.

Thereafter, the second electronic device 1010 determines whether the emergency signal is permitted to be transmitted additionally. For example, the second electronic device 1010 may determine whether the emergency signal is valid in consideration of the TTL information of the emergency signal.

When the emergency signal is valid, the second electronic device 1010 broadcasts the emergency signal through the short-range communication network in step 1037.

A third electronic device 1020 may determine whether the emergency signal is repeatedly received when the emergency signal is received through a short-range communication network. For example, the third electronic device 1020 may determine whether the emergency signal is repeatedly received in consideration of the packet ID information and timestamp information of the emergency signal. When the emergency signal is repeatedly received, the third electronic device 1020 may discard the emergency signal.

When the emergency signal is not repeatedly received, the third electronic device 1020 displays the emergency information on the display unit according to emergency situation information included in the emergency signal in step 1039. For example, when the emergency signal includes disaster information according to earthquake occurrence, the third electronic device 1020 displays earthquake occurrence information on the display unit on the display unit as illustrated in FIG. 13B. When the emergency signal includes location information at which the earthquake occurs, the third electronic device 1020 may display the location information 1311 at which the earthquake occurs on a map. As another example, when the emergency signal includes crime prevention information, the third electronic device 1020 displays criminals' location information on the display unit on the display unit as illustrated in FIG. 13C. In this case, the third electronic device 1010 may display the criminals' location information 1321 on a map.

Thereafter, the third electronic device 1020 determines whether the emergency signal is permitted to be transmitted additionally. For example, the third electronic device 1020 may determine whether the emergency signal is valid in consideration of the TTL information of the emergency signal.

When the emergency signal is valid, the third electronic device 1020 may discard the emergency signal without additional transmission.

As described above, the second electronic device 1010 and the third electronic device 1020 may broadcast the valid emergency signal toward the short-range communication area. In this case, at least one of the second electronic device 1010 or the third electronic device 1020 may add the location information of the electronic device itself to the emergency signal. When the location information is not included in the emergency signal and it is possible to estimate the location of the second electronic device 1010, the second electronic device 1010 may add the location information of the second electronic device 1010 to the emergency signal and broadcast the same to the short-range communication area.

Figure 11:
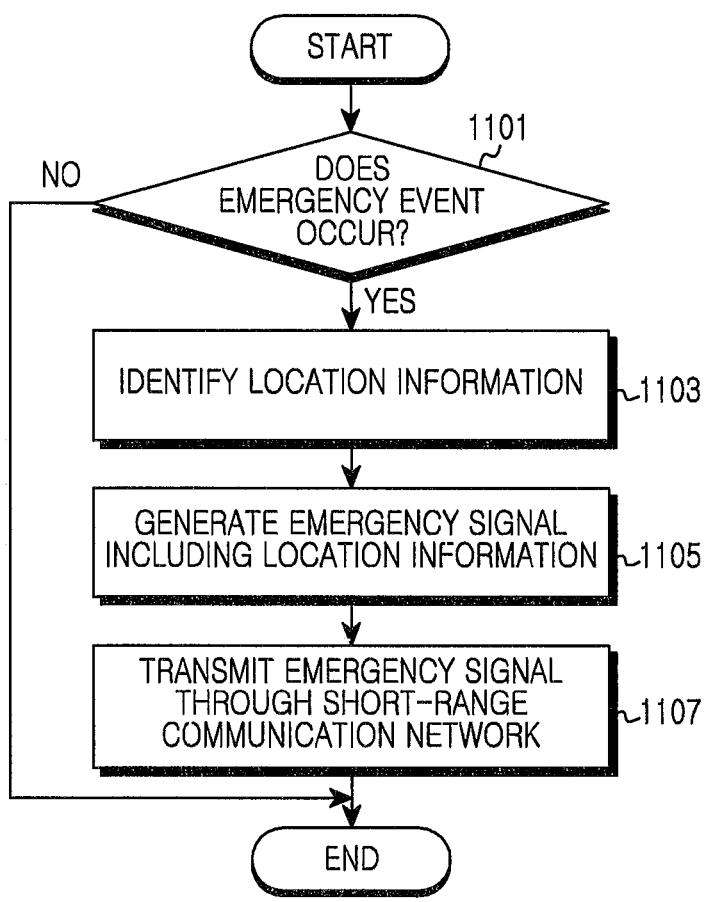
FIG. 11 illustrates a flowchart for a process of transmitting emergency information using short-range communication in an electronic device according to an embodiment of the present disclosure.

FIG. 11 illustrates a flowchart for a process of transmitting emergency information using short-range communication in an electronic device according to an embodiment of the present disclosure. The following description is given under the assumption that the electronic device is able to estimate location information.

Referring to FIG. 11, in step 1101, the electronic device determines whether there occurs an emergency event. For example, the electronic device may determine whether an emergency signal generation menu is selected according to input information provided from an input device. As another example, the electronic device may determine whether the electronic device is out of a limited movement area or enters a restricted zone based on the location information of the electronic device.

When the emergency event does not occur, the electronic device may end the algorithm.

When the emergency event occurs, the electronic device estimates a location in step 1103. For example, the electronic device may estimate the location of the electronic device based on satellite signals provided from a satellite. As another example, the electronic device may estimate the location of the electronic device by using at least one neighboring base station.

In step 1105, the electronic device generates an emergency signal including the location information of the electronic device.

After the generation of the emergency signal, the electronic device broadcast the emergency signal through a short-range communication network in step 1107.

Figure 12:
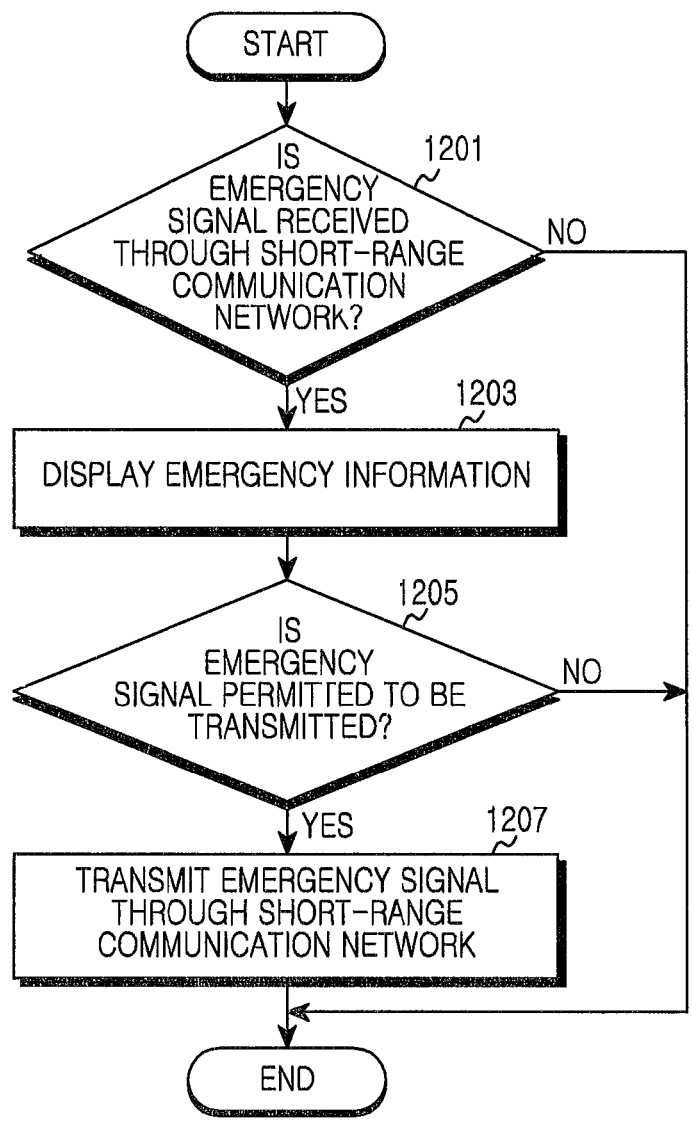
FIG. 12 illustrates a flowchart for a process of identifying emergency information using short-range communication in an electronic device according to an embodiment of the present disclosure.

FIG. 12 illustrates a flowchart for a process of identifying emergency information using short-range communication in an electronic device according to an embodiment of the present disclosure.

Referring to FIG. 12, in step 1201, the electronic device determines whether an emergency signal is received through a short-range communication network.

When the emergency signal is not received through the short-range communication network, the electronic device may end the algorithm.

When the emergency signal is received through the short-range communication network, the electronic device displays emergency information included in the emergency signal on a display unit in step 1203. Specifically, when the emergency signal is received through the short-range communication network, the electronic device determines whether the emergency signal is repeatedly received. When the emergency signal is not received repeatedly, the electronic device displays the emergency information included in the emergency signal on the display unit. For example, when the emergency signal includes disaster information according to earthquake occurrence, the electronic device displays earthquake occurrence information on the display unit on the display unit as illustrated in FIG. 13B. When the emergency signal includes location information at which the earthquake occurs, the electronic device may display the location information 1311 at which the earthquake occurs on a map. As another example, when the emergency signal includes crime prevention information, the electronic device displays criminals' location information on the display unit on the display unit as illustrated in FIG. 13C. In this case, the electronic device may display the criminals' location information 1321 on a map.

In step 1205, the electronic device determines whether the emergency signal is permitted to be transmitted additionally. For example, the electronic device may determine whether the emergency signal is valid in consideration of the TTL information of the emergency signal.

When the emergency signal is not permitted to be transmitted additionally, the electronic device may end the algorithm. In this case, the electronic device may discard the emergency signal.

When the emergency signal is permitted to be transmitted additionally, the electronic device broadcasts the emergency signal toward the short-range communication area through the short-range communication network in step 1207.

As described above, the electronic device relays the emergency information using short-range communication, thereby transmitting the emergency information rapidly and far away without requiring additional cost.

In addition, the electronic device which is in the sleep mode relays the emergency information using short-range communication without activating the control unit, thereby reducing power consumption according to relay of the emergency information.

It will be appreciated that embodiments of the present disclosure according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method of operating an electronic device, the method comprising:
    establishing a short-range communication link with another electronic device using a first short-range communication network;
    generating an emergency signal in response to the short-range communication link with the other electronic device being disconnected, the emergency signal including identification information generated by applying a random number to unique identification information of at least one electronic device of the electronic device or the other electronic device; and
    broadcasting the emergency signal using a second short-range communication network.

2. The method of claim 1, wherein generating the emergency signal comprises:
    determining whether the short-range communication link with the other electronic device is disconnected based on a strength of a signal provided from the other electronic device through the first short-range communication network; and
    generating the emergency signal in response to the short-range communication link with the other electronic device being disconnected.

3. The method of claim 1, wherein the emergency signal further includes at least one of a packet identifier (ID), a short-range communication link ID, an emergency situation type, an emergency signal create time, a delivery count, a time to live (TTL), a delivery number, or location information.

4. The method of claim 3, wherein the short-range communication link ID includes the identification information and the unique identification information includes at least one of a MAC address, a mobile equipment ID (MEID), an International Mobile Equipment Identity (IMEI), or a telephone number.

5. The method of claim 1, wherein:
the first short-range communication network and the second short-range communication network are identical to or different from each other, and
the first or second short-range communication network includes at least one of infrared wireless communication, Bluetooth communication, Zigbee communication, or wireless LAN communication.

6. A method for receiving an emergency signal in an electronic device, the method comprising:
receiving an emergency signal through a short-range communication network, the emergency signal including identification information generated by applying a random number to unique identification information of at least one electronic device of the electronic device or another electronic device;
determining whether the electronic device is a destination of the emergency signal;
identifying one or more of an emergency situation type or emergency situation location information included in the emergency signal when the electronic device is the destination of the emergency signal; and
displaying one or more of the emergency situation type or the emergency situation location information.

7. The method of claim 6, wherein the short-range communication network includes at least one of infrared wireless communication, Bluetooth communication, Zigbee communication, or wireless LAN communication.

8. The method of claim 6, wherein determining whether the electronic device is the destination of the emergency signal comprises determining whether identification information of a short-range communication link included in the emergency signal is included in identification information of at least one short-range communication link stored in the electronic device.

9. The method of claim 6, further comprising:
determining whether the emergency signal is repeatedly received based on an identifier (ID) of the emergency signal after the emergency signal is received; and
determining whether the electronic device is the destination of the emergency signal when the emergency signal is not repeatedly received.

10. The method of claim 6, further comprising:
determining whether location information is included in the emergency signal when the electronic device is not the destination of the emergency signal;
adding location information of the electronic device to the emergency signal when the location information is not included in the emergency signal; and
broadcasting the emergency signal using the short-range communication network when the location information is included in the emergency signal.

11. The method of claim 10, further comprising:
determining whether the emergency signal is valid when the electronic device is not the destination of the emergency signal; and
determining whether the location information is included in the emergency signal when the emergency signal is valid.

12. An electronic device comprising:
at least one short-range communication unit; and
at least one processor configured to
establish a short-range communication link with another electronic device using a first short-range communication network through the short-range communication unit,
generate an emergency signal in response to the short-range communication link with the other electronic device being disconnected, the emergency signal including identification information generated by applying a random number to unique identification information of at least one electronic device of the electronic device or the other electronic device, and
broadcast the emergency signal using a second short-range communication network through the short-range communication unit.

13. The electronic device of claim 12, wherein the processor is configured to:
determine whether the short-range communication link with the other electronic device is disconnected based on a strength of a signal provided from the other electronic device through the first short-range communication network, and
generate an emergency signal in response to the short-range communication link with the other electronic device being disconnected.

14. The electronic device of claim 12, wherein the emergency signal further includes at least one of a packet identifier (ID), a short-range communication link ID, an emergency situation type, an emergency signal create time, a delivery count, a time to live (TTL), a delivery number, or location information.

15. The electronic device of claim 14, wherein the short-range communication link ID includes the identification information the unique identification information includes at least one of a MAC address, a mobile equipment ID (MEID), an International Mobile Equipment Identity (IMEI) or a telephone number.

16. The electronic device of claim 12, wherein:
the first short-range communication network and the second short-range communication network are identical to or different from each other,
the first or second short-range communication network includes at least one of infrared wireless communication, Bluetooth communication, Zigbee communication, or wireless LAN communication.

17. An electronic device comprising:
a display unit;
at least one short-range communication unit; and
at least one processor configured to:
receive, via the short-range communication unit, an emergency signal through a short-range communication network, the emergency signal including identification information generated by applying a random number to unique identification information of at least one electronic device of the electronic device or another electronic device,
determine whether the electronic device is a destination of the emergency signal,
identify one or more of an emergency situation type or emergency situation location information included in the emergency signal when the electronic device is the destination of the emergency signal, and
instruct the display to display one or more of the emergency situation type or the emergency situation location information.

18. The electronic device of claim 17, wherein the short-range communication network includes at least one of infrared wireless communication, Bluetooth communication, Zigbee communication, or wireless LAN communication.

19. The electronic device of claim 17, wherein the processor is configured to determine whether identification information of a short-range communication link included in the emergency signal is included in identification information of at least one short-range communication link stored in the electronic device.

20. The electronic device of claim 17, wherein the processor is configured to:
   determine whether the emergency signal is repeatedly received based on an identifier (ID) of the emergency signal after the emergency signal is received, and
   determine whether the electronic device is the destination of the emergency signal when the emergency signal is not repeatedly received.

21. The electronic device of claim 17, wherein the processor is configured to:
   determine whether location information is included in the emergency signal when the electronic device is not the destination of the emergency signal;
   add location information of the electronic device to the emergency signal when the location information is not included in the emergency signal; and
   broadcasts the emergency signal using the short-range communication unit when the location information is included in the emergency signal.

22. The electronic device of claim 21, wherein the processor is configured to:
   determine whether the emergency signal is valid when the electronic device is not the destination of the emergency signal, and
   determine whether the location information is included in the emergency signal when the emergency signal is valid.

* * * * *